UNITED STATES PATENT OFFICE.

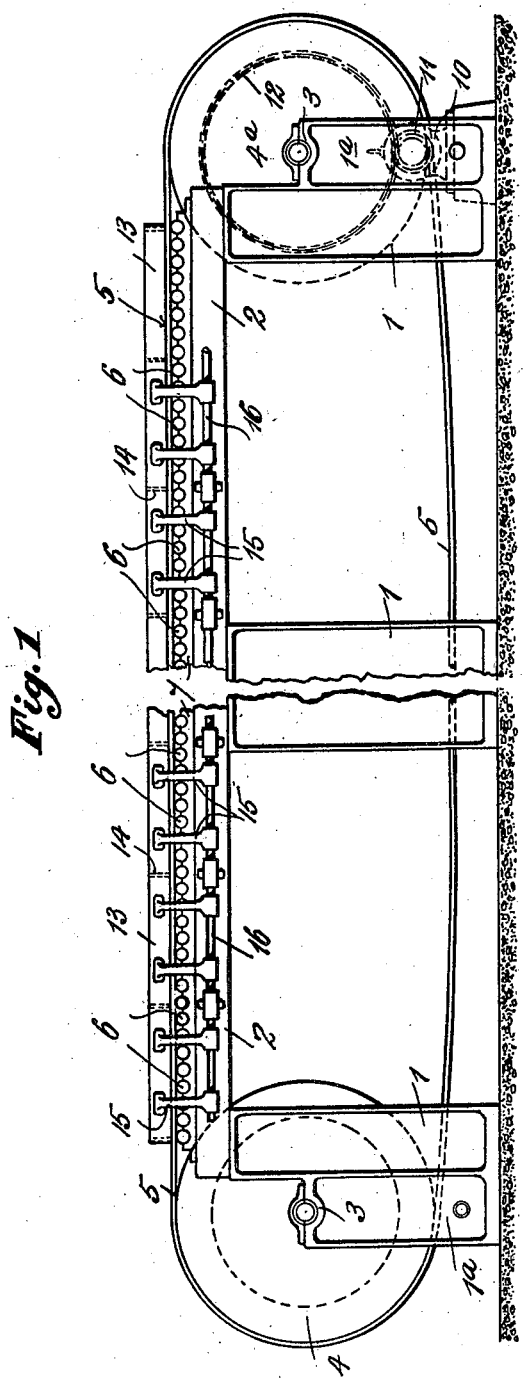

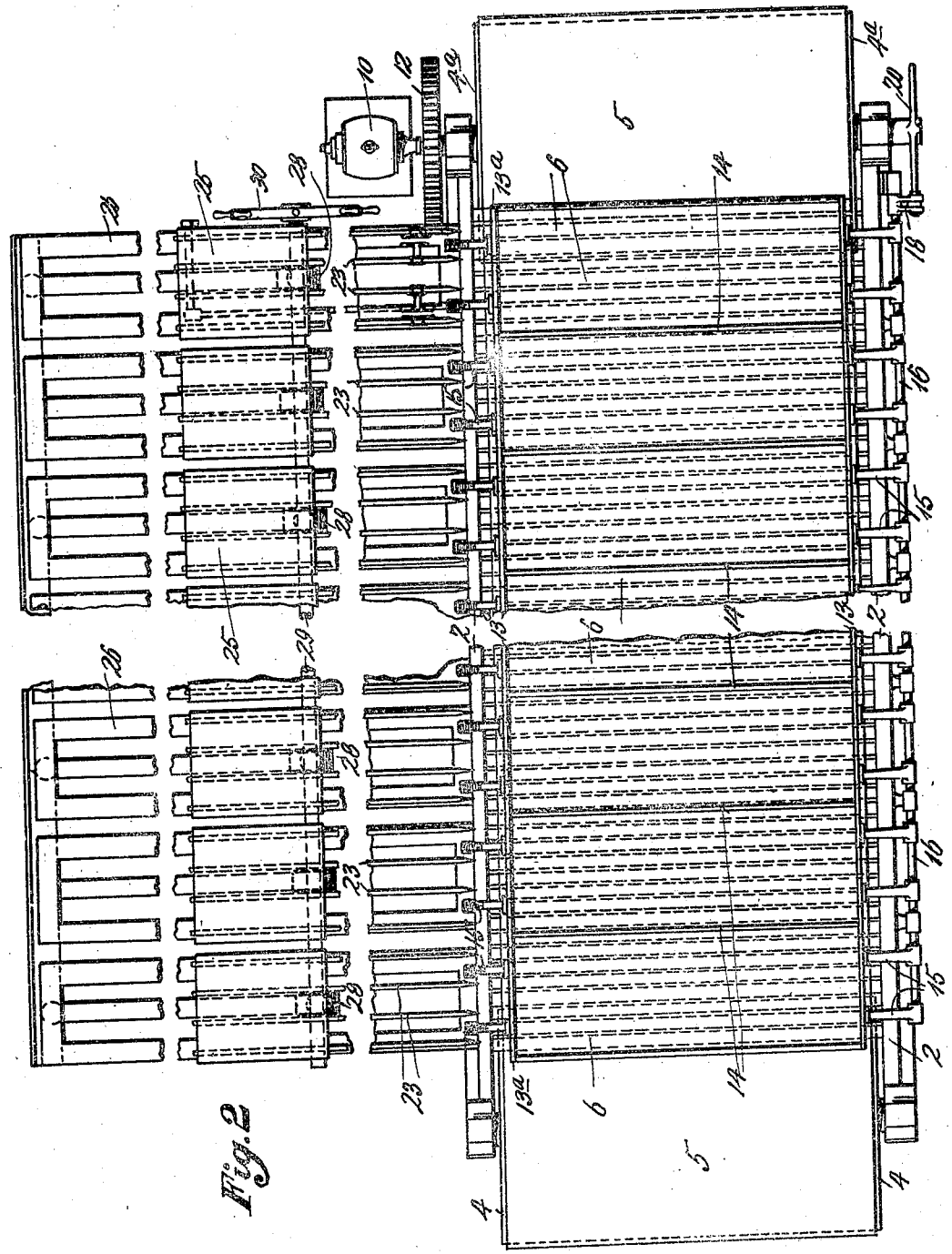

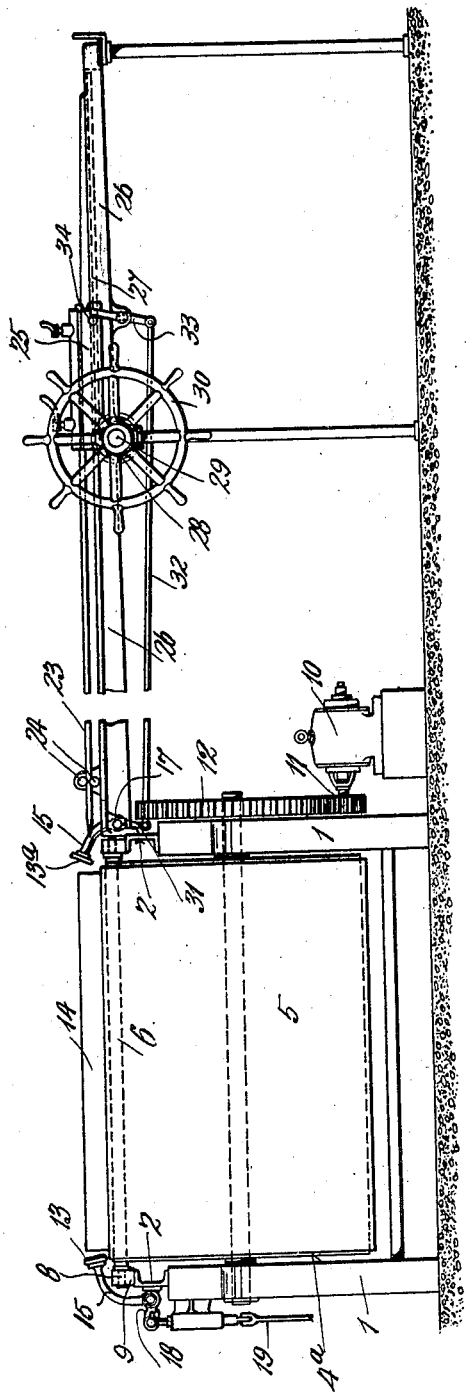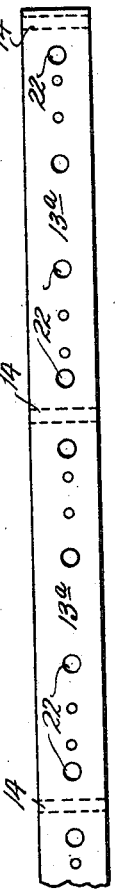

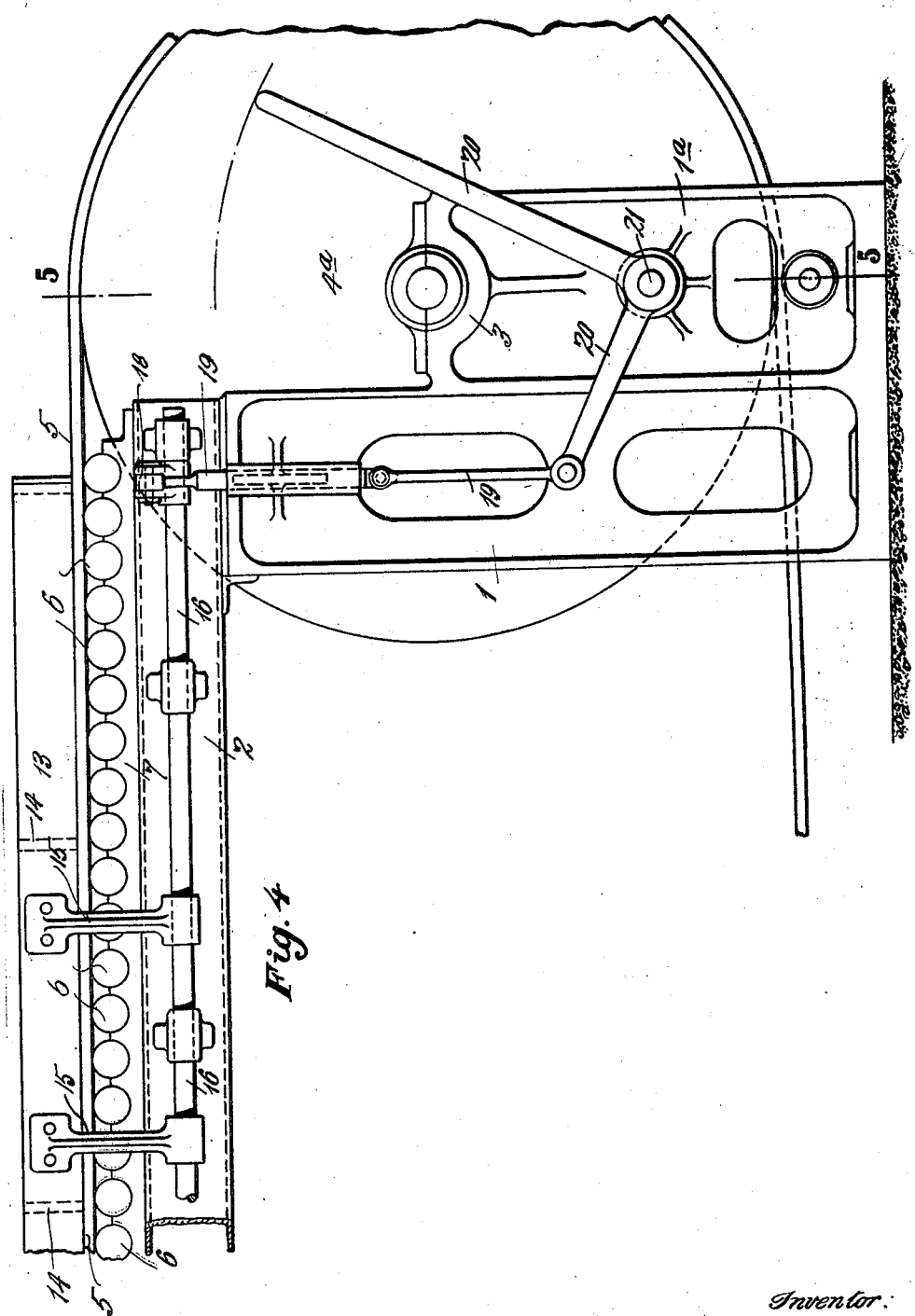

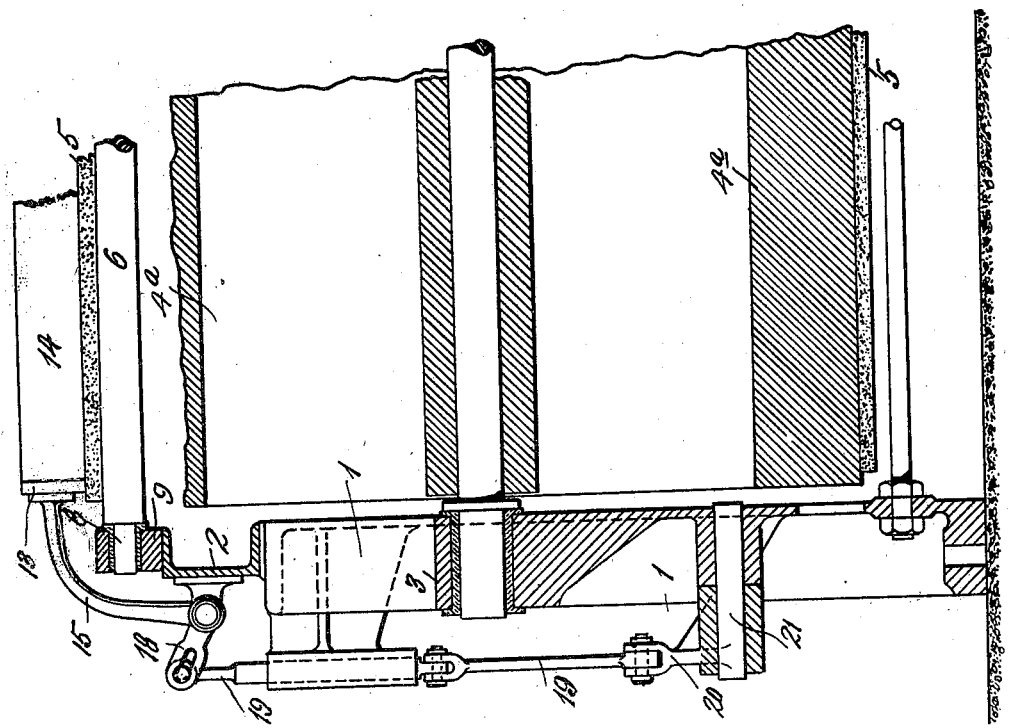

FRANK MIHILL JOHNSON, OF MITCHAM, ENGLAND, ASSIGNOR OF ONE-HALF TO THE FIRM OF CAFFERATA & CO., OF NEWARK-ON-TRENT, ENGLAND.

PLASTER-SLAB-MOLDING MACHINE.

1,380,721.      Specification of Letters Patent.      Patented June 7, 1921.

Application filed December 15, 1919. Serial No. 345,020.

*To all whom it may concern:*

Be it known that I, FRANK MIHILL JOHNSON, of Mitcham, in the county of Surrey, England, manufacturer, a subject of the King of England, have invented certain new and useful Improvements in Plaster-Slab-Molding Machines, of which the following is a specification.

This invention relates to the manufacture of slabs, plates and the like (hereinafter referred to as slabs) of plaster, gypsum or similar plastic material, chiefly for building purposes, and the object is to simplify and expedite the production of said articles in a more or less continuous manner with a minimum of labor and at a relatively low cost.

In the conventional method of manufacture of such articles, a number of mold frames are arranged on a table into which the plaster is poured, the arrangement and setting up of said frames necessitating the use of keys, wedges or other means for securing and adjusting the mold parts, and after the slabs are sufficiently set, said mold parts have to be knocked down again for removal of the slab, these operations requiring considerable time and labor.

According to the present invention, there is provided a relatively long endless conveyer passing over a stationary table, bench or support, this conveyer being of appropriate material such as rubber and being mounted at its ends on rollers, wheels or the like, one or both of which may be capable of being driven from a motor suitably arranged according to requirements whereby the conveyer is moved slowly over the table. At each side of said conveyer are disposed hinged or pivoted plates or bars, which support members, which may be provided with grooves or guides for receiving the ends of separating plates, as of steel, arranged across the conveyer at suitable distances apart, these separating plates forming two sides of the molds and the other mentioned members the other two sides thereof, the base of the molds being formed by the conveyer. When said separating plates and side members have been set up to form the number of molds determined or limited by the capacity of the table, the plaster or other material to form the slab is poured into the molds by any appropriate method or means, being then strickled off at the top and tamped if necessary and allowed to set, whereupon movement is imparted to the conveyer, and as the respective molds reach the discharge end of the table, an operator there stationed and having if necessary control of the driving mechanism, removes the separating plates and having turned down the hinged side members, which are normally retained in vertical position, can withdraw the slabs in succession and pass them to any convenient position or to other workmen.

An embodiment of apparatus for carrying out the invention is illustrated in the accompanying drawings in which:—

Figure 1 is a broken side elevation of the molding table and conveyer with parts omitted for clearness of illustration.

Fig. 2 is a plan view of Fig. 1 showing in addition certain other parts, hereinafter referred to.

Fig. 3 is an end view of Fig. 2.

Fig. 4 is a detail view on an enlarged scale of the discharge end of the molding table showing means for controlling the movable side mold members.

Fig. 5 is a partial cross section on the line 5—5 of Fig. 4.

Fig. 6 is a detail view of part of one of the vertical side mold members.

Referring to the drawings, the molding table comprises vertical side frame members 1 suitably formed as castings and longitudinal top frame members 2 suitably formed of channel iron, the side members 1 at each end being extended as at $1^a$ to afford bearings 3 for the axles of pulleys 4, $4^a$ about which passes the endless conveyer 5, the upper run of which constitutes the base of the molding surface. In order to reduce friction, the endless upper surface of the table is shown as constituted by a plurality of rollers 6 placed close together and extending transversely of the table, upon which rollers the lower surface of the upper run of the conveyer 5 bears. The said rollers have their ends bearing in recessed side bars 7 carried by the top frames 2 as shown in Figs. 1 and 4, or their ends may be reduced as at 8 and engage apertures in a bar 9 mounted on the top frames 2, as indicated in Figs. 3 and 5.

The roller $4^a$ at the discharge end of the table is shown as driven by means of an electric motor 10 through spur-gears 11 and 12, suitable control means (not shown) being provided for starting and stopping the motor at will.

At each side of the mold table and normally resting on the lateral edges of the conveyer 5 are plates 13, 13$^a$, which when in vertical position constitute two end walls of the molds, the side walls thereof being formed by removable plates 14 as of steel (see particularly Fig. 2) which are placed by hand in proper vertical position and if necessary enter at their ends in recesses or notches which may be formed in the inner surfaces of said plates 13, 13$^a$. The latter are carried by a number of arms 15 all mounted on rock shafts 16, 17 at opposite sides of the table, the shaft 16 being provided at the discharge end of the table with a lever 18 to which is pivoted the upper end of a jointed rod 19, the lower end of which is in turn pivoted to a manually operable bell-crank lever 20 mounted at 21 in a frame extension 1$^a$. By this means the plate 13 in question can be moved into the vertical position to constitute mold end walls as in Fig. 5 or be swung back clear of the slab in the mold as in Fig. 3.

At the other side of the table the construction shown is somewhat different, for the reason that in the apparatus under consideration it is desired to produce perforated slabs, that is to say, slabs having a number of holes extending longitudinally through same. In such a case the plate 13$^a$ at this side is provided with a number of apertures 22 (see Fig. 6) through each of which there is caused to extend a pointed rod 23, four such rods being shown for each slab. The rods are carried at their forward ends between pairs of guiding rollers 24 and at their rear ends are clamped in groups on slides 25 movable over a frame or bench 26, for which purpose the base of the slide is provided with one or more racks 27 with each of which meshes a pinion 28 carried by a shaft 29 mounted below the frame 26 and manually operable by a hand-wheel 30 positioned adjacent the discharge end of the molding table.

With such an arrangement the plate 13$^a$ carried by the rock-shaft 17 is differently controlled to the plate 13, and the means shown for effecting such control consists in providing a lever 31 at the end of said shaft 17 connected by a rod 32 to another lever 33 fulcrumed on the frame 26 and operable by an abutment 34 on the slide 25 in such a manner that after the rods 23 are withdrawn from the slabs by actuating the hand-wheel 30, a further movement of the slide will cause the plate 13$^a$ to be rocked clear of the slab, as shown in Fig. 3.

The apparatus above described is operated or used as follows in the production of a number of slabs simultaneously.

The molds constituted by the plates 13, 13$^a$ in vertical position and the removable spaced plates 14 having been set up on the conveyer 5, the material to be molded is fed into the molds, whereupon the rods 23 are operated to extend through the apertures 22 in the plate 13$^a$ and enter the edges of the slabs in the molds and penetrate into said slabs to produce the perforations therein. Surplus material may previously have been or now if necessary be strickelled off the upper surface of the molds and after a suitable time has elapsed the rods are withdrawn. The slabs in the molds are now allowed to set and when this is sufficiently effected, the side mold plate 13 is swung down out of contact with the slab material by the lever 20 and the plate 13$^a$ similarly dealt with through the hand-wheel 30. Movement is thereupon imparted to the conveyer at a slow speed and the operator at the discharge end of the table removes the slabs one by one as they are fed along and also withdraws the spacing plates 14. When the table is emptied, the molds are again set up as described and the operation repeated.

After having started up the machine or apparatus, it may be possible to continue the process uninterruptedly if the rate of movement of the conveyer is such as to permit the material to set within the time occupied by its travel over the length of the table, or said movement of the conveyer is controlled either under continuous or intermittent movement in any appropriate manner to allow of a substantially continuous process being carried out.

What I claim as my invention and desire to secure by Letters Patent of the United States is:—

1. A plaster slab molding machine comprising a molding table, an endless conveyer, one run of which passes over said table, to constitute a mold base, swinging members disposed adjacent the lateral edges of the belt and adapted to form mold walls, removable plates, disposed transversely of the table between said swinging members to constitute other mold walls and means for moving the conveyer over the table.

2. A plaster slab molding machine comprising a molding table, a plurality of closely spaced rollers forming the upper surface of said table, an endless conveyer movable over said rollers in contact therewith and constituting a mold base, swinging members disposed adjacent the lateral edges of the belt and adapted to form mold walls, removable plates, disposed transversely of the table between said swinging members to constitute other mold walls, and means for moving the conveyer over the table.

3. A plaster slab molding machine comprising a molding table, an endless conveyer movable over said table and constituting a mold base, swinging members disposed one at each side of the table and bearing on the conveyer to constitute mold walls, removable plates disposed transversely of the table between the swinging members to constitute other mold walls, and a series of pointed elements adapted to pass through one of said swinging members to produce channels in the material in the molds.

4. A plaster slab molding machine comprising a molding table, a plurality of closely juxtaposed rollers forming the upper surface of said table, an endless conveyer, one run of which passes over said rollers in contact therewith to constitute a mold base, a swinging member disposed longitudinally at each side of the table and bearing on the conveyer to produce mold walls, removable plates disposed transversely of the table between said swinging members to constitute other mold walls, a plurality of pointed elements disposed laterally of the table and movable through one of said swinging members to enter the material in the molds for producing channels therein, and means for moving the conveyer over the table.

In witness whereof I have signed this specification.

FRANK MIHILL JOHNSON.